Patented Nov. 20, 1928.

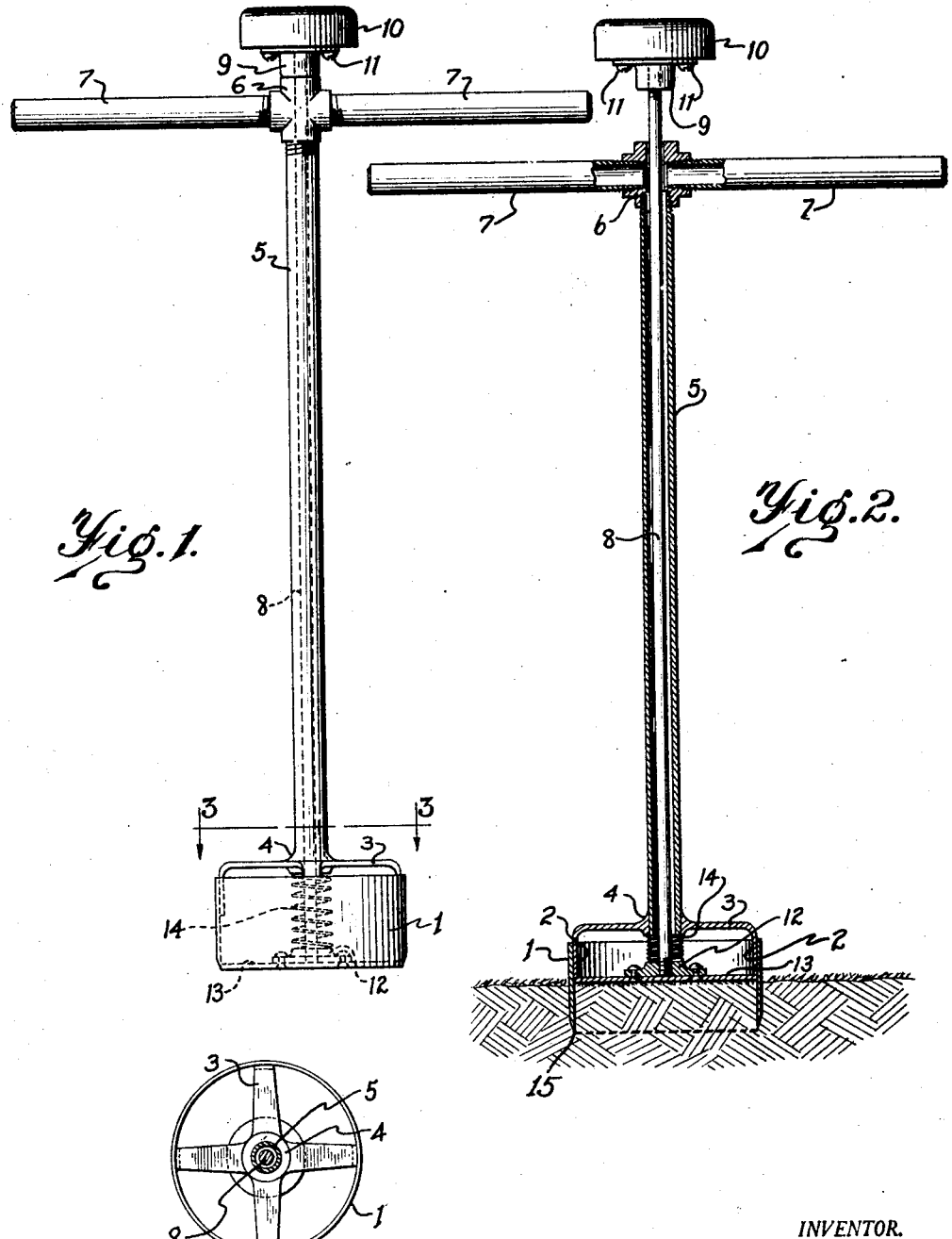

1,692,436

UNITED STATES PATENT OFFICE.

HARRY B. DEANE, OF MONROE, MICHIGAN.

TURF-CUTTING DEVICE.

Application filed August 31, 1926. Serial No. 132,721.

This invention relates to turf or sod cutting devices and the object of the invention is to provide a device by means of which a small piece of sod may be removed from a lawn and a new piece of identically the same size may be inserted in place thereof. This device is particularly adapted for use on golf links where holes are made in the sod by the use of golf clubs. When a hole has been thus made the device is utilized to cut out the portion of the sod in which the hole has been made and insert a new piece of sod in place thereof. The device can also be used to cut out patches of wire grass, weed patches or other obnoxious growths which ruin the appearance of a lawn. A further object of the invention is to provide a device which may be forced into the turf and given a slight twist to separate the turf from the subsoil and when lifted carries a portion of the turf with it, the said device being provided with means for ejecting the turf. A novel feature of the invention is embodied in the construction whereby portions of sod of not only the same diameter but also of the same thickness may be removed or replaced upon each operation of the device. These objects and the several novel features of the invention are hereinafter more fully described and claimed and the preferred form of construction by which these objects are attained is shown in the accompanying drawings in which—

Fig. 1 is an elevation of the device.

Fig. 2 is a longitudinal section therethrough.

Fig. 3 is a section taken on line 3—3 of Fig. 1.

As shown in Figs. 2 and 3, the device comprises a thin cylindrical sheet steel cutting member 1 which is tempered and provided with a sharpened lower cutting edge 15 and the depending ends 2 of a spider 3 are welded to this member 1 as shown in Fig. 2. The spider 3, as shown in Fig. 3, is provided with a hub 4 in which a pipe or tube 5 is brazed or welded at the lower end. At the upper end the tube 5 is threaded into a union 6 and a pair of arms 7 are threaded into opposite sides of the said union. These arms 7 provide a means for holding the device and are utilized to apply force in cutting the turf and are also utilized to twist the device to separate the turf from the subsoil. A rod or tube 8 is reciprocably mounted in the pipe 5 and the upper end thereof is threaded into a member 9 which is secured to a head 10 by the screws 11. The lower end of the said rod 8 extends downwardly through the spider and is threaded into a member 12 which is riveted to a plunger 13 which fits the interior of the cylindrical cutter 1. A coiled spring 14 is positioned about the rod 8 and engages the member 12 at one end and the hub 4 of the spider at the opposite end.

In operation the plunger 13 is normally held in the position shown in dotted lines in Fig. 1 by the coiled spring 14, the member 11 engaging the upper end of the union 6 and thus limiting downward movement of the plunger 13. When the operator desires to remove a piece of sod he takes the device by the handles with the plunger in the position shown in dotted lines in Fig. 1 and positions it over the sod or turf to be removed and, by pressing down on the handles 7, the cylindrical cutter 1 is forced into the turf as shown in Fig. 2 the said turf forcing the plunger 13 upwardly until it strikes the depending ends 2 of the spider 3 thus limiting upward movement of the plunger 13 and regulating the depth of the cut as will be understood from Fig. 2. At this time the device is twisted by means of the handles 7 which breaks the turf away from the subsoil even with the lower edge 15 of the cylindrical cutter. The device is then lifted by the handles 7 and the piece of turf within the cylindrical cutter 1 is lifted out with the cutter. The turf can be then carried in the cutter, as the spring 14 is not of sufficient strength to eject the same, and it may be ejected by forcing down on the head 10. At this time a new piece of sod is cut by the device and carried to the place where the turf was removed and the device is positioned again in the same hole and the turf is ejected by forcing down on the head 10 and lifting on the handles 7. This withdraws the cylindrical cutter from the soil and securely sets the new sod in the place of the old, it being usually difficult to see that any sod has been removed. It can thus be seen that the plunger 13 may be used to press the sod or turf in place and as the cuttings are made of the same depth the surface of the replaced sod will be perfectly flush with the remainder of the lawn. It is also to be noted that these devices are made up in sets of different sizes so that all cuttings are of the same thickness but may be made of different diameters.

From the foregoing description it becomes evident that the device is very simple and efficient in operation, will not easily get out of order, is of strong and cheap construction and provides a device which accomplishes the objects described.

Having thus fully described my invention, its utility and mode of operation, what I claim and desire to secure by Letters Patent of the United States is—

1. In a turf cutting device, a cylindrical cutter, a spider having depending ends extending into the cylindrical cutter and to which the cutter is secured, a tube extending upwardly from the spider, a union threaded onto the upper end of the said tube and having an opening therethrough in alignment with the opening of the tube, a pair of arms threaded into opposite sides of the said union and extending at a right angle to the said tube, a rod reciprocably mounted in the tube and extending through the said union, a head on the upper end of the said rod the said rod also extending from the lower end of the pipe, a plunger secured to the lower end of the rod and fitting within the cylindrical cutter, downward movement of the said plunger being limited by said head striking the said union and upward movement of the plunger being limited by striking the depending ends of the spider.

2. In a turf cutting device, a cylindrical cutter, a spider secured across the upper end of the cutter, a tube secured to the lower end of the said spider, a union threaded onto the upper end of the said tube and having an opening therethrough in alignment with the opening of the tube, a pair of arms threaded into the opposite sides of the union and extending horizontally therefrom, a rod reciprocably mounted in the tube and extending through the said union at the upper end thereof a head on the upper end of the said rod, the said rod also extending from the lower end of the tube, a plunger secured to the lower end of the rod and fitting within the cylindrical cutter, the ends of the spider extending into the cylindrical cutter and limiting upward movement of the said plunger.

3. In a turf cutting device, a cylindrical cutter, a spider having legs extending downwardly into the cutter and to which the cylindrical cutter is secured, a tube secured to the spider, the upper end of the tube being provided with a pair of horizontally extending handles, a rod reciprocally mounted in the tube and extending from each end thereof, the upper end of the rod being provided with a head, a plunger secured to the lower end of the rod and fitting within the cylindrical cutter beneath the legs of the spider, the legs of the spider limiting upward movement of the plunger and rod.

In testimony whereof I sign this specification.

HARRY B. DEANE.